United States Patent [19]

Benguerel

[11] 4,384,870
[45] May 24, 1983

[54] DISAZO COMPOUNDS HAVING A SULFO GROUP-CONTAINING DIAZO COMPONENT RADICAL, A 1,4-PHENYLENE MIDDLE COMPONENT RADICAL HAVING A SUBSTITUTED AMINO GROUP AND A COUPLING COMPONENT RADICAL HAVING A FREE, ACYLATED OR ETHERIFIED HYDROXY GROUP

[75] Inventor: Francois Benguerel, Oberwil, Switzerland

[73] Assignee: Sandoz Ltd., Basel, Switzerland

[21] Appl. No.: 287,082

[22] Filed: Jul. 27, 1981

Related U.S. Application Data

[63] Continuation-in-part of Ser. No. 176,306, Aug. 8, 1980, abandoned.

[51] Int. Cl.³ .................... C09B 31/06; D06P 3/00
[52] U.S. Cl. .......................... 8/540; 8/539; 8/681; 8/687; 260/174; 260/186; 260/187
[58] Field of Search ............. 260/186, 187, 174, 191; 8/539, 681, 687, 540

[56] References Cited

U.S. PATENT DOCUMENTS

| | | | |
|---|---|---|---|
| 3,485,814 | 1/1969 | Speck | 260/186 |
| 3,594,363 | 7/1971 | Stingl | 260/186 |
| 3,676,050 | 7/1972 | James | 8/41 |
| 3,862,119 | 1/1975 | Stingl | 260/186 |
| 3,932,378 | 1/1976 | Fasciati | 260/174 |
| 3,951,590 | 4/1976 | Studer | 8/641 |
| 3,963,418 | 6/1976 | Tullio | 8/41 |
| 3,986,827 | 10/1976 | Dombchik | 8/41 |
| 3,997,522 | 12/1976 | Siegel et al. | 260/174 |
| 4,049,641 | 9/1977 | Studer | 260/191 |
| 4,055,560 | 10/1977 | Dombchik | 260/186 |
| 4,225,493 | 9/1980 | Nickel et al. | 260/186 |

FOREIGN PATENT DOCUMENTS 2809476 9/1978 Fed. Rep. of Germany .
1201546 8/1970 United Kingdom .
1258219 12/1971 United Kingdom .
1285045 8/1972 United Kingdom .
1489752 9/1975 United Kingdom .
1569062 6/1980 United Kingdom .

*Primary Examiner*—A. Lionel Clingman
*Attorney, Agent, or Firm*—Gerald D. Sharkin; Richard E. Vila; Melvyn M. Kassenoff

[57] ABSTRACT

Compounds of the formula

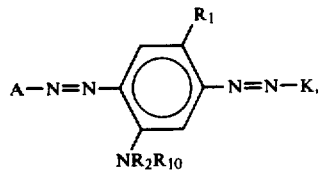

in which
  A is the radical of a sulpho group-containing diazo component of the aniline or 1- or 2-aminonaphthalene series,
  K is a coupling component radical of the phenol series, having a free hydroxy group or an etherified or acylated hydroxy group,
  $R_1$ is hydrogen $C_{1-4}$alkoxy, $C_{1-4}$alkyl or $C_{1-4}$haloalkyl,
  $R_2$ is $C_{1-4}$alkyl, $C_{1-6}$alkyl-CO-, $C_{1-6}$alkyl-O-CO-, -CONH$_2$, $C_{1-6}$alkyl-NH-CO-, di-($C_{1-6}$alkyl)N-CO-, 2-, 3-, 4-, 5- or 6-hydroxy($C_{2-6}$alkyl)-NH-CO- or (2-, 3-, 4-, 5- or 6-hydroxy($C_{2-6}$alkyl))$_2$N-CO-, and
  $R_{10}$ is hydrogen or $C_{1-4}$alkyl, and mixtures thereof, which compounds are in free acid or salt form and are useful for dyeing or printing anionic dyeable substrates such as leather, natural and synthetic polyamides, polyurethanes and polyolefins modified to contain basic groups, especially nylon.

40 Claims, No Drawings

DISAZO COMPOUNDS HAVING A SULFO GROUP-CONTAINING DIAZO COMPONENT RADICAL, A 1,4-PHENYLENE MIDDLE COMPONENT RADICAL HAVING A SUBSTITUTED AMINO GROUP AND A COUPLING COMPONENT RADICAL HAVING A FREE, ACYLATED OR ETHERIFIED HYDROXY GROUP

This application is a continuation-in-part of application Ser. No. 176,306, filed Aug. 8, 1980, and now abandoned.

The present invention relates to anionic disazo compounds, their preparation and use as anionic dyestuffs.

More particularly, the present invention provides compounds of formula I,

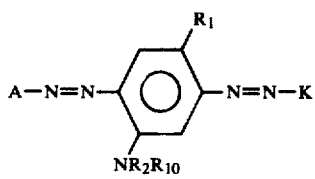

in which
- A is the radical of a sulpho group-containing diazo component of the aniline series or 1- or 2-aminonaphthalene series,
- K is a coupling component radical of the phenol series, the free hydroxy group of which may be etherified or acylated,
- $R_1$ is hydrogen, $C_{1-4}$alkoxy or $C_{1-4}$alkyl optionally monosubstituted by halogen,
- $R_2$ is $C_{1-4}$alkyl, $-CO(C_{1-6})$alkyl, $-COO(C_{1-6})$-alkyl, $-CONH_2$, $-CONH(C_{1-6})$alkyl, $-CON(C_{1-6}$alkyl$)_2$, $-CONH(C_{2-6})$hydroxyalkyl or $-CON(C_{2-6}$hydroxyalkyl$)_2$ with the hydroxy group in other than the 1-position, and
- $R_{10}$ is hydrogen or $C_{1-4}$alkyl, and the molecule contains a single sulphonic acid group which is on radical A, and mixtures of such compounds, which compounds are in free acid or salt form.

Any alkyl or alkoxy groups as $R_1$ preferably contain 1 or 2 carbon atoms, more preferably 1 carbon atom; any alkyl substituted by halogen is preferably monochloro($C_{1-2}$)alkyl.

$R_1$ is preferably $R_1'$, where $R_1'$ is hydrogen, methyl, ethyl, methoxy or ethoxy. More preferably $R_1$ is $R_1''$, where $R_1''$ is hydrogen, methyl or methoxy. Most preferably $R_1$ is $R_1'''$, where $R_1'''$ is hydrogen or methoxy, with hydrogen being especially preferred.

Any alkyl as $R_2$ is preferably methyl or ethyl, especially methyl. Any $C_{1-6}$alkyl group in $R_2$ which is bound to

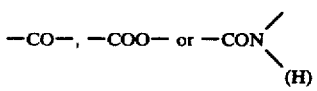

preferably contains 1 to 4 carbon atoms, more preferably 1 or 2 carbon atoms, and is most preferably methyl. Any $C_{2-6}$hydroxyalkyl group is preferably 2-hydroxyethyl or 2- or 3-hydroxypropyl.

$R_2$ is preferably $R_2'$, where $R_2'$ is $-CO(C_{1-4})$alkyl, $-COO(C_{1-4})$alkyl or $-CONH_2$. More preferably $R_2$ is $R_2''$, where $R_2''$ is $-CO(C_{1-2})$alkyl, $-COO(C_{1-2})$alkyl or $-CONH_2$. Most preferably $R_2$ is $R_2'''$, where $R_2'''$ is $-COCH_3$, $-COOCH_3$ or $-CONH_2$, especially $-COCH_3$.

Any alkyl as $R_{10}$ is preferably methyl or ethyl, especially methyl.

$R_{10}$ is preferably hydrogen, methyl or ethyl, more preferably hydrogen or methyl, especially hydrogen.

A is preferably a radical of formula (a) or (b),

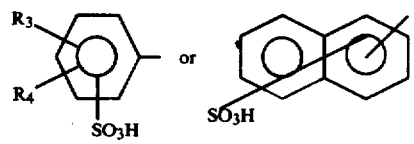

in which
- $R_3$ is hydrogen, halogen, $C_{1-4}$alkyl optionally monosubstituted by halogen; $C_{1-4}$alkoxy, monoC$_{1-6}$alkylamino, di-C$_{1-6}$alkylamino, C$_{1-6}$alkylcarbonylamino, C$_{1-12}$alkoxycarbonylamino or N-C$_{1-4}$alkyl-N-(C$_{1-6}$alkyl or C$_{1-12}$alkoxy)carbonylamino, and
- $R_4$ is hydrogen, halogen, $C_{1-4}$-alkyl or $C_{1-4}$alkoxy.

K is preferably a radical of formula (c) or (d),

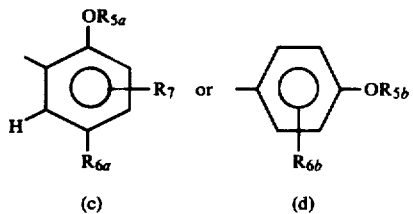

in which
each of $R_{5a}$ and $R_{5b}$ is hydrogen, $C_{1-4}$alkyl, $C_{2-4}$hydroxyalkyl with the hydroxy group in other than the 1-position,

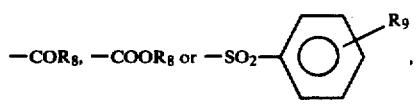

in which
- $R_8$ is $C_{1-12}$alkyl or phenyl-$C_{1-4}$alkyl, and
- $R_9$ is hydrogen, halogen, $C_{1-4}$alkyl or $C_{1-4}$alkoxy,
- $R_{6a}$ is an aliphatic, cycloaliphatic, carbocyclic aromatic or araliphatic radical, halogen, $C_{1-4}$alkoxy, $-NR_{11}CO(C_{1-6})$alkyl or $-NR_{11}COO-(C_{1-6})$alkyl,
- $R_7$ is hydrogen, halogen, $C_{1-4}$alkyl, $C_{1-4}$alkoxy or $-NR_{11}CO(C_{1-6})$alkyl, with the proviso that $R_7$ is other than $-NR_{11}CO(C_{1-6})$alkyl when $R_{6a}$ is $-NR_{11}CO(C_{1-6})$alkyl,
- $R_{6b}$ is hydrogen, $C_{1-4}$alkyl, $C_{1-4}$alkoxy, halogen, $-NR_{11}CO(C_{1-6})$alkyl or $-NR_{11}COO(C_{1-6})$alkyl, and
- $R_{11}$ is hydrogen or $C_{1-4}$alkyl.

By halogen is meant fluorine, chlorine or bromine. Any halogen on a phenyl ring is preferably chlorine or bromine, especially chlorine; any alkyl substituted by halogen is preferably substituted by fluorine, chlorine or bromine, especially by chlorine.

In any significance of $R_2$ or $R_3$ containing two alkyl or hydroxyalkyl substituents, the two substituents may be the same or different.

Any unsubstituted or substituted alkyl groups as $R_3$ preferably contain 1 or 2 carbon atoms, especially 1 carbon atom; $R_3$ is preferably unsubstituted alkyl. Any alkyl as $R_4$ is preferably methyl or ethyl, especially methyl. Any alkoxy as $R_3$ or $R_4$ is preferably methoxy or ethoxy, especially methoxy.

Any monoalkylamino group as $R_3$ preferably contains a methyl or ethyl group, especially a methyl group. Any dialkylamino group as $R_3$ preferably contains methyl and/or ethyl groups, especially methyl groups. Any $C_{1-4}$alkyl in N-alkyl-N-alkylcarbonyl- or -N-alkoxycarbonyl-amino as $R_3$ is preferably methyl. Any alkylcarbonylamino as $R_3$ is most preferably acetamido; any alkoxycarbonylamino is preferably $C_{1-4}$alkoxy-, most preferably $C_{1-2}$-alkoxycarbonylamino, or $C_{8-12}$alkoxycarbonylamino.

$R_3$ is preferably $R_3'$, where $R_3'$ is hydrogen, halogen, $C_{1-4}$alkyl, $C_{1-4}$alkoxy or acetamido. More preferably $R_3$ is $R_3''$, where $R_3''$ is hydrogen, chlorine, $C_{1-2}$alkyl, $C_{1-2}$-alkoxy or acetamido. Most preferably $R_3$ is $R_3'''$, where $R_3'''$ is hydrogen, chlorine, methyl, methoxy or acetamido, especially hydrogen.

$R_4$ is preferably $R_4'$, where $R_4'$ is hydrogen, halogen, $C_{1-2}$alkyl or $C_{1-2}$alkoxy. More preferably $R_4$ is $R_4''$, where $R_4''$ is hydrogen, chlorine, methyl or methoxy. Most preferably $R_4$ is hydrogen. Preferably $R_4$ is hydrogen, when $R_3$, $R_3'$, $R_3''$ or $R_3'''$ is acetamido.

When both $R_3$ and $R_4$ are hydrogen the sulpho group is preferably in the 3- or 4-position (with the azo group in the 1-position). When one of $R_3$ and $R_4$ is hydrogen and the other is other than hydrogen the preferred positions are 2,4, 2,5, 2,6 and 3,4, especially 2,4 and 2,5. When both $R_3$ and $R_4$ are other than hydrogen the three substituents are preferably in the 2,3,5-, 2,4,5- or 2,4,6-positions and most preferably in the 2,4,5- or 2,4,6-positions.

Especially preferred is the radical of formula (a), wherein (i) both $R_3$ and $R_4$ are hydrogen and the sulpho group is in the 3- or 4-position; or wherein (ii) one of $R_3$ and $R_4$ is hydrogen and the other is chlorine, methyl or methoxy, the positions for $R_3$ or $R_4$ and the sulpho group are 2,4 or 2,5; or wherein $R_4$ is hydrogen and $R_3$ is acetamido in the 4- or 5-position and the sulpho group is in the 2-position; or wherein (iii) $R_3$ and $R_4$, independently, are methyl, methoxy or chlorine and $R_3$, $R_4$ and the sulpho group are in the 2,4,5- or 2,4,6-positions.

When the naphthalene radical of formula (b) is bound in the 1-position, the sulpho group is preferably in the 4-, 5-, 6-, 7- or 8-position, especially in the 4- or 5-position. When the naphthalene radical is bound in the 2-position, the sulpho group is preferably in the 1-, 5-, 6-, 7- or 8-position, especially in the 1-, 5- or 6-position.

The radical (b) is preferably (b₁), where (b₁) is 4- or 5-sulphonaphthyl-1 or 1-, 5- or 6-sulphonaphthyl-2.

Any unsubstituted or substituted alkyl as $R_{5a}$ or $R_{5b}$ is preferably straight chain, any unsubstituted alkyl is preferably methyl or ethyl; any substituted alkyl is preferably 2-hydroxyethyl or 2- or 3-hydroxypropyl. Any —$COR_8$ group as $R_{5a}$ or $R_{5b}$ preferably contains $R_{8a}'$, where $R_{8a}'$ is straight chain or branched $C_{1-4}$alkyl or phenyl-($C_{1-3}$)alkyl; more preferably it contains $R_{8a}''$, where $R_{8a}''$ is methyl, ethyl or benzyl. Any —$COOR_8$ group as $R_{5a}$ or $R_{5b}$ preferably contains $R_{8b}'$, where $R_{8b}'$ is straight chain or branched $C_{1-12}$alkyl or phenyl-($C_{1-3}$)alkyl; more preferably it contains $R_{8b}''$, where $R_{8b}''$ is straight chain or branched $C_{8-12}$alkyl or benzyl; most preferably it contains $R_{8b}'''$, where $R_{8b}'''$ is $C_{8-12}$alkyl. In the

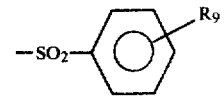

group any halogen as $R_9$ is most preferably chlorine; any alkyl is preferably methyl or ethyl, especially methyl, and any alkoxy is preferably methoxy or ethoxy.

$R_{5a}$ is preferably $R_{5a}'$, where $R_{5a}'$ is hydrogen, methyl, ethyl, 2-hydroxyethyl, —$COR_{8a}''$, —$COOR_{8b}'$, phenylsulphonyl or tosyl. More preferably $R_{5a}$ is $R_{5a}''$, where $R_{5a}''$ is hydrogen, methyl, ethyl or —$COOR_{8b}''$ (especially —$COOR_{8b}'''$). Even more preferably $R_{5a}$ is $R_{5a}'''$, where $R_{5a}'''$ is hydrogen, methyl or ethyl. Most preferably $R_{5a}$ is $R_{5a}''''$, where $R_{5a}''''$ is hydrogen or methyl, especially hydrogen.

$R_{5b}$ is preferably $R_{5b}'$, where $R_{5b}'$ is hydrogen, straight chain $C_{1-4}$alkyl, 2-hydroxyethyl, 2- or 3-hydroxypropyl, —$COR_{8a}'$, —$COOR_{8b}'$, phenylsulphonyl or tosyl. More preferably $R_{5b}$ is $R_{5b}''$, where $R_{5b}''$ is hydrogen, straight chain $C_{1-4}$alkyl, —$COR_{8a}''$, —$COOR_{8b}''$ (especially —$COOR_{8b}'''$), phenylsulphonyl or tosyl. Even more preferably $R_{5b}$ is $R_{5b}'''$, where $R_{5b}'''$ is hydrogen or straight chain $C_{1-4}$alkyl. Most preferably $R_{5b}$ is $R_{5b}''''$, where $R_{5b}''''$ is methyl or ethyl, especially methyl.

Any alkyl as $R_{11}$ in the group $R_{6a}$, $R_{6b}$ and $R_7$ is preferably methyl or ethyl, especially methyl.

$R_{11}$ is preferably hydrogen or methyl, especially hydrogen.

Any aliphatic, cycloaliphatic, carbocyclic aromatic or araliphatic groups as $R_{6a}$ may contain conventional substituents, for example substituents selected from the group consisting of halogen (fluorine, chlorine or bromine), $C_{1-4}$alkyl and $C_{1-4}$alkoxy; additionally, particularly any aliphatic group may contain hydroxy or cyano groups.

Any aliphatic group as $R_{6a}$ is preferably an unsubstituted straight chain or branched alkyl group containing 1-10, more preferably 1-6 and especially 1-4, carbon atoms. Any cycloaliphatic group preferably is cycloalkyl of 5-7 carbon atoms, especially 6 carbon atoms. Any carbocyclic aromatic or araliphatic group as $R_{6a}$ is preferably an unsubstituted or substituted phenyl or phenyl($C_{1-4}$)alkyl-group containing on each phenyl ring up to three substituents selected from the group consisting of halogen, $C_{1-4}$-alkyl and $C_{1-4}$alkoxy which substituents, when two or three are present, may be the same or different.

Any halogen as $R_{6a}$ is preferably chlorine; any alkoxy is preferably methoxy or ethoxy.

Any

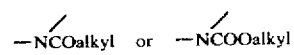

groups as $R_{6a}$ preferably contain $C_{1-4}$alkyl groups, especially $C_{1-2}$alkyl groups.

$R_{6a}$ is preferably $R_{6a}'$, where $R_{6a}'$ is straight chain or branched $C_{1-6}$alkyl, cyclohexyl, phenyl, benzyl, chlorine, methoxy, ethoxy or acetamido. More preferably $R_{6a}$ is $R_{6a}''$, where $R_{6a}''$ is straight chain or branched $C_{1-4}$alkyl, benzyl, chlorine, methoxy or ethoxy. Most preferably $R_{6a}$ is $R_{6a}'''$, where $R_{6a}'''$ is straight chain or branched $C_{1-4}$alkyl or chlorine.

Any halogen as $R_7$ is preferably chlorine; any alkyl or alkoxy groups preferably contain 1 or 2 carbon atoms, especially 1 carbon atom. Any $$-\text{N}\diagup^{\text{COalkyl}}$$

as $R_7$ preferably contains a $C_{1-4}$alkyl group, more preferably a $C_{1-2}$alkyl group, and is most preferably acetamido.

$R_7$ is preferably $R_7'$, where $R_7'$ is hydrogen, chlorine, methyl, ethyl, methoxy, ethoxy or acetamido. More preferably $R_7$ is $R_7''$, where $R_7''$ is hydrogen, chlorine, methyl, methoxy or acetamido, especially hydrogen.

Any halogen as $R_{6b}$ is preferably chlorine or bromine; any alkyl or alkoxy groups as $R_{6b}$ preferably contain 1 or 2 carbon atoms, especially 1 carbon atom. Any $$-\text{N}\diagup^{\text{COalkyl}} \quad \text{or} \quad -\text{N}\diagup^{\text{COOalkyl}}$$

groups as $R_{6b}$ preferably contain $C_{1-4}$alkyl, especially methyl, groups.

$R_{6b}$ is preferably $R_{6b}'$, where $R_{6b}'$ is hydrogen, chlorine, bromine, methyl, ethyl, methoxy, ethoxy or acetamido. More preferably $R_{6b}$ is $R_{6b}''$, where $R_{6b}''$ is hydrogen, chlorine, methyl, methoxy or acetamido, especially hydrogen.

A is preferably a group ($a_1$), where ($a_1$) is a group of formula (a), wherein $R_3$ is $R_3'$ and $R_4$ is $R_4'$, or of formula ($b_1$). More preferably A is a group ($a_2$), where ($a_2$) is a group of formula (a), wherein $R_3$ is $R_3''$ and $R_4$ is $R_4'$, or of formula ($b_1$). Most preferably A is a group ($a_3$), where ($a_3$) is a group of formula (a), wherein $R_3$ is $R_3'''$, especially hydrogen, and $R_4$ is $R_4''$, especially hydrogen. In the groups ($a_1$) to ($a_3$) the substituents are preferably in the above-given preferred positions.

K is preferably a group ($c_1$), where ($c_1$) is a group of formula (c), wherein $R_{5a}$ is $R_{5a}'$, $R_{6a}$ is $R_{6a}'$ and $R_7$ is $R_7'$; or a group ($d_1$), where ($d_1$) is a group of formula (d), wherein $R_{5b}$ is $R_{5b}'$ (especially $R_{5b}''$) and $R_{6b}$ is $R_{6b}'$. More preferably K is a group ($c_2$), where ($c_2$) is a group of formula (c), wherein $R_{5a}$ is $R_{5a}'''$, $R_{6a}$ is $R_{6a}'$ and $R_7$ is $R_7''$; or a group ($d_2$), where ($d_2$) is a group of formula (d), wherein $R_{5b}$ is $R_{5b}'''$ and $R_{6b}$ is $R_{6b}'$. Even more preferably K is a group ($c_3$), where ($c_3$) is a group of formula (c), wherein $R_{5a}$ is $R_{5a}''''$ (especially hydrogen), $R_{6a}$ is $R_{6a}'''$ and $R_7$ is hydrogen; or a group ($d_2$). Still further, more preferably K is a group ($d_3$), where ($d_3$) is a group of formula (d), wherein $R_{5b}$ is $R_{5b}''''$ and $R_{6b}$ is $R_{6b}'$, and most preferably K is a group ($d_4$), where ($d_4$) is a group of formula (d), wherein $R_{5b}$ is $R_{5b}''''$ (especially methyl) and $R_{6b}$ is hydrogen.

Preferred compounds of formula I are
(1) those wherein A is a group ($a_1$) or ($b_1$);
(2) those wherein A is a group ($a_2$) or ($b_1$);
(3) those wherein $R_1$ is $R_1'$, $R_2$ and $R_{10}$ is hydrogen;
(4) those wherein K is a group ($c_1$) or ($d_1$);
(5) those wherein K is a group ($c_3$) or ($d_2$);
(6) those wherein K is a group ($d_2$);
(7) those of formula Ia,

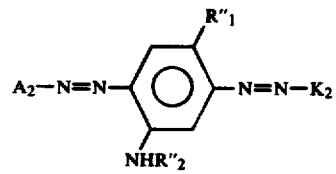

in which
$A_2$ is a group of formula ($a_2$)

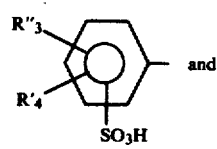

$K_2$ is a group of formula ($d_3$)

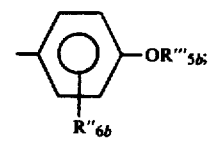

(8) those of (7), wherein $A_2$ is a group ($a_3$);
(9) those of (7), wherein $K_2$ is a group ($d_4$), and especially the group

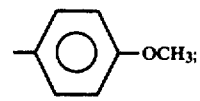

(10) those of (7), (8) or (9), wherein $R_1''$ is $R_1'''$ especially hydrogen, and $R_2''$ is $R_2'''$, especially —COCH$_3$;
(11) those of (8) wherein (i) when both $R_3''$ and $R_4'$ are hydrogen, the sulpho group is in the 3- or 4-position, (ii) when one of $R_3''$ and $R_4'$ is hydrogen and the other is chlorine, methyl or methoxy, $R_3''$ or $R_4'$ (whichever is other than hydrogen) and the sulpho group are in the 2,4- or 2,5-positions, (iii) when $R_3''$ is 4- or 5-acetamido and $R_4'$ is hydrogen, the sulpho group is in the 2-position and (iv) when each of $R_3''$ and $R_4'$ is independently methyl, methoxy or chlorine, $R_3''$, $R_4'$ and the sulpho group are in the 2,4,5- or 2,4,6-positions;
(12) those wherein A is a group of formula (a) or (b) and K is a group of formula (c) or (d); and
(13) those of (12) wherein $R_{10}$ is hydrogen.

Further preferred compounds of formula I are those in which A is a radical of formula (b) or (a'),

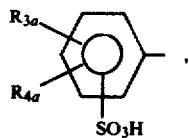

wherein $R_{3a}$ has one of the significances of $R_3$ and $R_{4a}$ has one of the significances of $R_4$ with the exception of $C_{1-4}$-alkoxy for both $R_{3a}$ and $R_{4a}$;

preferred (a') is a group ($a_1'$),

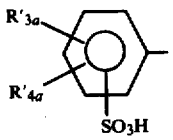

wherein $R_{3a}'$ has one of the significances of $R_3'$ with the exception of $C_{1-4}$alkoxy and $R_{4a}'$ has one of the significances of $R_4'$ with the exception of $C_{1-2}$alkoxy;

more preferred (a') is a group ($a_2'$),

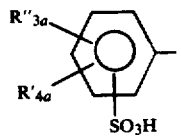

wherein $R_{3a}''$ has one of the significances of $R_3''$ with the exception of $C_{1-2}$alkoxy and $R_{4a}'$ is as defined above;

especially preferred (a') is a group $a_3'$),

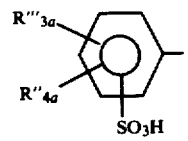

wherein $R_{3a}'''$ has one of the significances of $R_3'''$ and $R_{4a}''$ has one of the significances of $R_4''$ with the exception of methoxy for both $R_{3a}'''$ and $R_{4a}''$.

Further preferred groups of compounds of formula I wherein A is a group of formula (a') or (b) are
(1) those wherein $R_{10}$ is hydrogen;
(2) those wherein $R_2$ is $C_{1-4}$alkyl-CO—, $C_{1-4}$alkyl-O—CO— or —CONH$_2$;
(3) those wherein K is a group of formula (c) or (d) wherein $R_{6a}$ is $C_{1-6}$alkyl, cyclohexyl, phenyl, benzyl, chlorine, methoxy, ethoxy or acetamido;
(4) those wherein $R_1$ is hydrogen, $C_{1-4}$alkyl or $C_{1-4}$alkyl monosubstituted by halogen;
(5) those of (1), (2) and (3) wherein $R_1$ is hydrogen, $C_{1-4}$alkyl or $C_{1-4}$alkyl monosubstituted by halogen.

Further preferred compounds of formula I are those wherein $R_1$ is hydrogen or $C_{1-4}$alkyl optionally monosubstituted by halogen; more preferred $R_1$ is hydrogen, methyl or ethyl and especially preferred $R_1$ is hydrogen or methyl.

The present invention further provides a process for the production of compounds of formula I comprising coupling the diazonium derivative of compound of formula II,

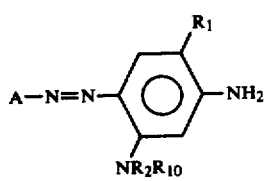

or a mixture thereof,
with a coupling component of the phenol series, and optionally etherifying or acylating the hydroxy group.

Thus, compounds of formula Ib,

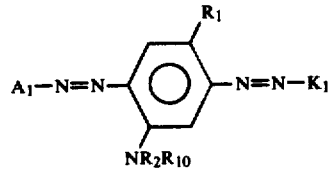

in which
$A_1$ is a group of formula (a) or (b),
$K_1$ is a group of formula (c) or (d) and
$R_1$, $R_2$ and $R_{10}$ are as defined above,
and mixtures thereof are obtained comprising
(a) coupling the diazonium derivative of compound of formula IIa,

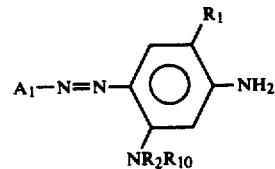

or a mixture thereof,
with a phenol of formula IIIa or IIIb

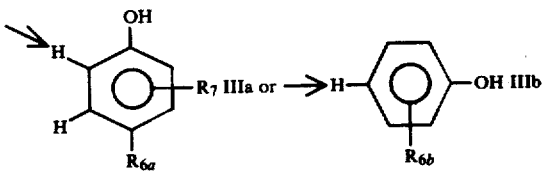

or a mixture thereof,
to obtain a compound of formula Ix,

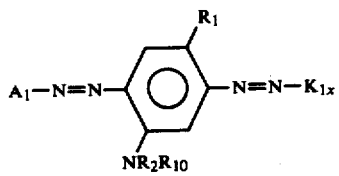

in which
$K_{1x}$ is a group of formula ($a_x$) or ($b_x$),

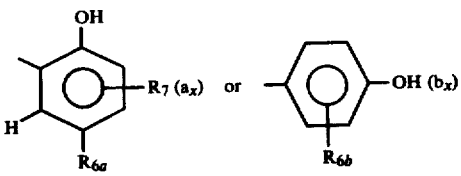

or a mixture thereof,
or
(b) etherifying or acylating a compound of formula Ix or a mixture thereof, to obtain a compound of formula Ib wherein $R_{5a}$ or $R_{5b}$ is other than hydrogen.

The coupling reaction may be effected in accordance with known methods; suitably, coupling is effected in alkaline medium at the pH range of 9 to 13, the preferred pH being from 10 to 12. Diazotization of a compound of formula II or IIa to produce the corresponding diazonium compounds may also be carried out in conventional manner.

The etherification or acylation may be effected in known manner. Suitably, the etherification is carried out employing the corresponding dialkylsulphate or alkyleneoxide. The reaction is suitably carried out in aqueous alkaline medium, the preferred pH being from 9 to 11. The reaction temperature is suitably from 30° to 90° C., more preferably from 40° to 70° C.

Acylation is suitably effected employing the corresponding acid chloride. The reaction mixture is preferably aqueous which is made alkaline with soda, the preferred pH being from 8 to 10. The reaction temperature is suitably between 30° and 90° C., preferably between 60° and 70° C.

The compounds of formula I may be isolated in accordance with known methods. In general owing to the process/isolation conditions, the compounds of formula I may be obtained in salt form.

When the compounds of formula I are in the salt form, the cation of the sulpho group is not critical and may be any of those non-chromophoric cations conventional in anionic dyestuffs. Examples of such cations are alkali metal cations and cations of the ammonium type including unsubstituted and substituted ammonium cations, e.g., lithium, sodium, potassium, ammonium, mono-, di-, tri- and tetra-methylammonium, triethylammonium and mono-, di- and tri-ethanolammonium. The preferred cations are the alkali metal cations and unsubstituted ammonium, with sodium being the most preferred.

The compounds of formula I which are in the salt form may be converted into the free acid form or into other salt forms in accordance with known methods.

The starting materials of formula II are either known or may be prepared in accordance with known methods from available starting materials. Thus, the compounds of formula II are obtained by coupling the diazonium derivative of an amine A-NH$_2$ in a weakly acid to neutral medium with the corresponding aniline of formula IV,

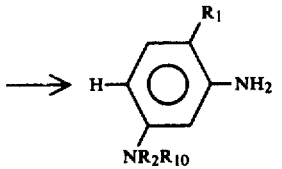

or a derivative thereof reacted with ω-methanesulphonic acid. Compounds of formula IV and phenols of formula IIIa or IIIb are either known or may be prepared in accordance with known methods from available starting materials.

The compounds of formula I and mixtures thereof are useful for dyeing or printing anionic dyeable substrates. Suitable substrates include leather, natural and synthetic polyamides, polyurethanes and basic-modified polyolefins. Especially suitable are textile substrates consisting of or comprising natural and synthetic polyamides, such as wool and silk, and particularly nylon. The dyestuffs may advantageously be used for carpet printing.

The compounds of formula I and mixtures thereof may be employed as such or may be used in the form of liquid or solid preparations. The preparation of stable liquid, for example concentrated aqueous preparations or solid preparations may be carried out in accordance with conventional methods, for example by dissolving in suitable solvents e.g. water, optionally with the addition of conventional additives such as solubilizing agents, for example urea, or by grinding or granulating. Such preparations may be obtained in accordance with the procedure described in French Pat. Nos. 1,572,030 and 1,581,900.

Further, the compounds of formula I and mixtures thereof may be made up into preparations which are dispersible in cold water. Such dispersions may be prepared, for example, by grinding the dye dry or wet in aqueous dispersing medium in the presence of one or more conventional anionic dispersing agents and optionally in the presence of other conventional additives, optionally with subsequent spray-drying. The preparations so obtained are finely dispersed in cold water.

Dyeing and printing may be carried out in accordance with known methods, for example pad dyeing or exhaust dyeing, especially the latter since the compounds of formula I and mixtures thereof exhaust from a neutral dyebath. Furthermore, the compounds of formula I and mixtures thereof are also useful for use in the "space-dyeing" process.

The compounds of formula I and mixtures thereof are well soluble in water, build-up well, migrate well and give even dyeings, especially on stripy nylon. The dyeings obtained possess notable light-fastness. Furthermore, the compounds of formula I and their mixtures give dyeings which have notable general fastnesses, such as wet-fastnesses, especially wash-, water-, milling- and sweat-fastness.

The compounds of formula I are suitable for combining with other anionic dyes which exhaust from a neutral dyebath, whereby tone-in-tone dyeings having the above-mentioned advantageous properties are obtained. Further, such dyeings do not exhibit catalytic fading.

The following Examples further serve to illustrate the invention. In the Examples, all parts are by weight and all degrees are in degrees Centigrade.

EXAMPLE 1

17.3 Parts sodium salt of 1-aminobenzene-3-sulphonic acid are dissolved in 80 parts water and are then mixed with 6.9 parts sodium nitrite. This solution is slowly added with stirring to a mixture of 50 parts ice and 28 parts 30% hydrochloric acid. After 1 hour at 5°-10°, the excess of nitrous acid is destroyed by adding a small quantity of amidosulphonic acid. The diazonium suspension obtained is added to a solution of 18.7 parts of 3-aminoacetanilide in the hydrochloric acid salt form and 5 parts calcinated sodium carbonate in 150 parts water and 100 parts ice, at 0°-5° while stirring, the pH being maintained at 6-7 by the addition of calcinated sodium carbonate. After stirring for 1 hour, the monoazo compound is salted out by the addition of sodium chloride. The precipitated dyestuff is isolated by filtering and washed with 5% sodium chloride solution.

The paste obtained is dissolved in 170 parts water of 60° and is then mixed with 6.9 parts sodium nitrite. This solution is slowly added dropwise to a mixture of 60 parts ice and 28 parts hydrochloric acid, the temperature being kept at 5°-10° by the addition of ice. After 2 hours the excess of nitrous acid is destroyed by the addition of amidosulphonic acid. The diazonium suspension is slowly added to a solution of 9.5 parts phenol and 13 parts 30% caustic soda in 140 parts water at room temperature. After 15 minutes the coupling reaction is complete. The dyestuff is pecipitated by the addition of sodium chloride at pH 9, and is isolated by filtering, washed with 5% sodium chloride solution and dried. The dyestuff which, in the free acid form, corresponds to the formula

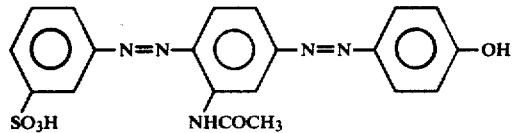

is obtained in the sodium salt form and gives dyeings on natural or synthetic polyamides of reddish-yellow shades which have good light- and wet-fastnesses.

EXAMPLE 2

The etherification of the hydroxy group of the disazo dyestuff obtained by the method of Example 1 is carried out as follows: The filtered and washed dyestuff of Example 1 in paste form is dissolved in water 45°–50° by adding 10 parts of 30% sodium hydroxide solution. To this solution 25 parts dimethylsulphate are added while stirring vigorously, the pH being kept at 10.5–11.0 by the addition of 30% sodium hydroxide solution. After 4 hours the etherification is complete. Precipitation of the dyestuff is completed by adding sodium chloride. The dyestuff is isolated by filtering, washed with 5% sodium chloride solution and dried. The disazo compound which, in the free acid form, corresponds to the formula

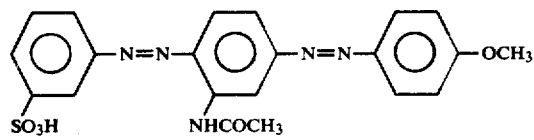

is obtained in the sodium salt form and gives dyeings on natural or synthetic polyamides of reddish-yellow shades. The dyeings have good light- and wet-fastnesses.

In analogy with the procedure described in Example 1 using a mixture of 1-aminobenzene-3-and -4-sulphonic acid (in the ratio of approximately 1:1) instead of 1-aminobenzene-3-sulphonic acid, the mixture of corresponding dyestuffs is obtained which can be etherified according to the method described in Example 2. This mixture of dyes (containing hydroxy groups or methoxy groups) is particularly well soluble in water and therefore especially useful for dyeing of natural or synthetic polyamides, giving dyeings of reddish-yellow shades which have good light-and wet-fastnesses.

EXAMPLE 3

In analogous manner as described in Example 2 the hydroxy group of the disazo dyestuff obtained by the method of Example 1 can be etherified by using propylene oxide as follows: The dyestuff of Example 1 in paste form is dissolved in water of 65°–70° by adding 10 parts 30% sodium hydroxide solution. Then 25 parts propylene oxide are added while stirring vigorously, the pH being kept at 9–10 by the addition of 30% sodium hydroxide solution. After 6 hours the etherification is complete. The dyestuff which is isolated in analogous manner as described in Example 2 corresponds, in the free acid form, to the formula

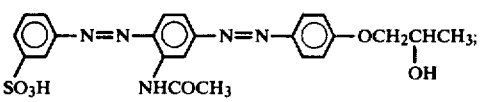

it is obtained in the sodium salt form and gives dyeings on natural or synthetic polyamides of reddish yellow shades. The dyeings have good light- and wet-fastnesses.

In the following tables further dyestuffs are given which are prepared in analogy with the procedure described in Example 1, 2 or 3. These dyestuffs, owing to the reaction- and isolation-steps, are obtained in the sodium salt form. The dyestuffs correspond to formula A,

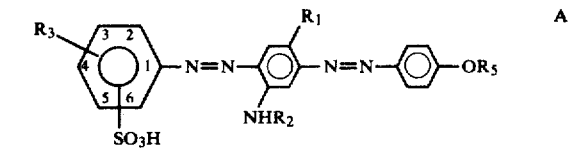

for Table 1;
to formula B,

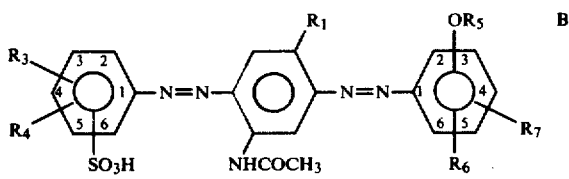

for Table 2;
and to formula C,

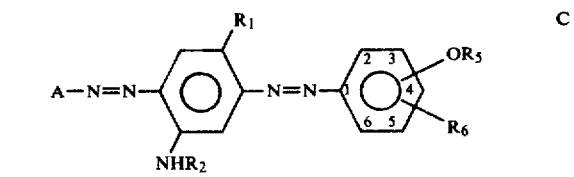

for Table 3.

The symbol I in the last column of the tables denotes the dye shade on natural or synthetic polyamides, especially on nylon, where a is reddish-yellow; b is orange; c is scarlet-red;
d is red; e is yellowish-red; f is brownish-yellow;
g is brownish-red; and h is brown.

The polyamide dyeings obtained have good light- and wet-fastnesses.

TABLE 1 formula A

| Example No. | position SO₃H | R₃ | R₁ | R₂ | R₅ | I |
|---|---|---|---|---|---|---|
| 4 | 4 | H | H | COCH₃ | H | a |
| 5 | 4 | H | H | " | CH₃ | a |
| 6 | 3 | H | OCH₃ | " | H | c |
| 7 | 3 | H | " | " | CH₃ | c |
| 8 | 4 | H | H | " | " | c |
| 9 | 4 | H | " | " | C₂H₅ | c |
| 10 | 4 | H | H | " | Tosyl | a |
| 11 | 3 | H | H | CONH₂ | H | a |
| 12 | 3 | H | H | " | CH₃ | a |
| 13 | 2 | —NHCOCH₃(4) | H | COCH₃ | H | a |
| 14 | 2 | " | H | " | CH₃ | a |
| 15 | 2 | —NHCOCH₃(5) | H | " | " | a |
| 16 | 3 | H | CH₃ | " | " | a |
| 17 | 3 | H | OCH₃ | " | C₂H₅ | c |
| 18 | 4 | CH₃(2) | " | " | CH₃ | c |
| 19 | 4 | " | CH₃ | " | " | a |
| 20 | 4 | " | " | " | C₂H₅ | a |
| 21 | 5 | " | H | " | CH₃ | b |
| 22 | 2 | CH₃(4) | OCH₃ | " | " | c |
| 23 | 5 | OCH₃(2) | H | " | C₂H₅ | b |
| 24 | 2 | Cl(4) | H | " | CH₃ | a |
| 25 | 2 | " | H | " | Tosyl | a |
| 26 | 5 | Cl(2) | H | " | CH₃ | a |
| 27 | 3 | H | OCH₃ | " | COOCH₃ | b |
| 28 | 3 | H | " | " | COOCH₂CH(CH₃)₂ | b |
| 29 | 3 | H | " | " | COOC₁₀H₂₁(n) | b |
| 30 | 4 | CH₃(2) | " | " | C₂H₅ | c |
| 31 | 4 | Cl(2) | " | " | CH₃ | c |
| 32 | 2 | —NHCOCH₃(4) | " | " | " | c |
| 33 | 3 | H | H | COC₂H₅ | " | a |
| 34 | 4 | H | H | " | " | a |
| 35 | 4 | H | OCH₃ | COC₂H₅ | C₂H₅ | c |
| 36 | 3 | H | H | " | " | a |
| 37 | 3 | H | H | " | Tosyl | a |
| 38 | 5 | Cl(2) | H | COOCH₃ | CH₃ | a |
| 39 | 5 | " | CH₃ | " | " | a |
| 40 | 2 | CH₃(4) | OCH₃ | " | " | c |
| 41 | 2 | " | H | " | " | a |
| 42 | 2 | " | H | " | C₂H₅ | a |
| 43 | 5 | OCH₃(2) | H | " | CH₃ | b |
| 44 | 4 | H | H | " | C₂H₅ | a |
| 45 | 4 | H | H | COOC₂H₅ | CH₃ | a |
| 46 | 3 | H | OCH₃ | CONH₂ | " | c |
| 47 | 4 | H | " | " | " | c |
| 48 | 4 | H | H | " | Tosyl | a |
| 49 | 4 | Cl(2) | H | COCH₃ | CH₃ | a |
| 50 | 4 | " | H | " | C₂H₅ | a |
| 51 | 4 | H | H | " | " | a |
| 52 | 3 | H | H | " | " | a |
| 53 | 4 | H | H | " | CH₂CHCH₃ \| OH | a |
| 54 | 3 | H | H | " | CH₂CHCH₂CH₃ \| OH | a |

TABLE 2 formula B

| Example No. | position SO₃H | R₃ | R₄ | R₁ | OR₅ | R₆ | R₇ | I |
|---|---|---|---|---|---|---|---|---|
| 55 | 4 | H | H | H | OH(2) | Cl(5) | H | a |
| 56 | 4 | H | H | H | OCH₃(2) | " | H | a |
| 57 | 3 | H | H | H | OH(2) | " | H | a |
| 58 | 3 | H | H | H | OCH₃(2) | " | H | a |
| 59 | 3 | H | H | OCH₃ | OH(2) | " | H | g |
| 60 | 3 | H | H | " | OCH₃(2) | " | H | e |
| 61 | 3 | H | H | CH₃ | OH(2) | C(CH₃)₃(5) | H | b |
| 62 | 3 | H | H | OCH₃ | " | " | CH₃(3) | d |
| 63 | 3 | H | H | " | OC₂H₅(2) | CH₃(5) | H | d |
| 64 | 4 | H | H | " | OCH₃(2) | CH(CH₃)₂(5) | H | d |
| 65 | 4 | H | H | CH₃ | OH(2) | CH₃(5) | H | b |
| 66 | 3 | H | H | OCH₃ | OCH₃(4) | —NHCOCH₃(3) | H | b |
| 67 | 3 | H | H | " | OC₂H₅(4) | " | H | c |
| 68 | 3 | H | H | CH₃ | " | —NHCOCH₃(2) | H | d |

TABLE 2-continued formula B

| Example No. | position SO₃H | R₃ | R₄ | R₁ | OR₅ | R₆ | R₇ | I |
|---|---|---|---|---|---|---|---|---|
| 69 | 4 | H | H | OCH₃ | OCH₃(4) | " | H | d |
| 70 | 5 | CH₃(2) | H | H | " | CH₃(2) | H | b |
| 71 | 6 | " | CH₃(4) | OCH₃ | OC₂H₅(4) | H | H | c |
| 72 | 2 | Cl(5) | " | CH₃ | OCH₃(4) | H | H | a |
| 73 | 4 | Cl(2) | Cl(5) | OCH₃ | " | H | H | c |
| 74 | 4 | " | " | H | " | H | H | a |
| 75 | 3 | H | H | H | " | —NHCOCH₃(2) | H | b |
| 76 | 3 | Cl(4) | H | H | OCH₃(4) | CH₃(3) | H | a |
| 77 | 4 | H | H | CH₃ | OC₂H₅(4) | CH₃(2) | H | a |
| 78 | 3 | H | H | H | OCH₃(4) | —NHCOCH₃(3) | H | a |
| 79 | 4 | H | H | OC₂H₅ | " | H | H | c |
| 80 | 3 | H | H | H | OH(2) | CH₃(5) | —NHCOCH₃(3) | f |
| 81 | 3 | H | H | H | OCH₃(2) | " | " | a |
| 82 | 3 | H | H | H | OC₂H₅(4) | —NHCOCH₃(2) | H | b |
| 83 | 4 | H | H | OCH₃ | OCH₃(4) | " | H | d |
| 84 | 3 | H | H | " | OCH₃(2) | —NHCOCH₃(5) | H | g |
| 85 | 3 | H | H | " | OCOOCH₃(4) | —NHCOCH₃(2) | H | d |
| 86 | 3 | H | H | " | OCOOCH₂CH(CH₃)₂ (4) | " | H | d |
| 87 | 3 | H | H | " | OCOOC₁₀H₂₁(n)(4) | " | H | d |
| 88 | 3 | H | H | " | OC₂H₅(2) | —NHCOCH₃(5) | H | g |
| 89 | 3 | H | H | " | OC₂H₅(4) | —NHCOCH₃(2) | H | d |
| 90 | 3 | H | H | " | OCH₃(4) | Cl(2) | H | c |
| 91 | 3 | H | H | " | OH(2) | C(CH₃)₃(5) | H | g |
| 92 | 3 | H | H | " | OCH₃(4) | CH₃(2) | H | b |
| 93 | 4 | Cl(2) | H | " | OH(2) | C(CH₃)₃(5) | H | g |
| 94 | 4 | " | H | " | OCH₃(4) | " | H | c |
| 95 | 3 | H | H | " | OH(2) | CH₃(5) | —NHCOCH₃(3) | h |
| 96 | 4 | Cl(2) | H | " | OCH₃(4) | —NHCOCH₃(2) | H | d |
| 97 | 3 | H | H | " | " | OCH₃(2) | H | c |
| 98 | 4 | OCH₃(2) | CH₃(5) | " | OH(4) | H | H | c |
| 99 | 4 | " | " | " | OCH₃(4) | H | H | c |
| 100 | 3 | H | H | " | " | —NHCOCH₃(2) | H | c |

TABLE 3 formula C

| Example No. | A | R₁ | R₂ | OR₅ | R₆ | I |
|---|---|---|---|---|---|---|
| 101 | 4-Sulfonaphthyl-1 | H | COCH₃ | OH(4) | H | c |
| 102 | " | H | " | OCH₃(4) | H | c |
| 103 | 5-Sulfonaphthyl-1 | H | " | " | H | c |
| 104 | " | H | COC₂H₅ | " | H | c |
| 105 | " | H | CONH₂ | " | H | c |
| 106 | " | H | COCH₃ | OH(2) | Cl(5) | c |
| 107 | 6-Sulfonaphthyl-2 | H | " | OH(4) | H | b |
| 108 | " | H | " | OCH₃(4) | H | b |
| 109 | " | CH₃ | " | " | H | c |
| 110 | " | OCH₃ | " | " | H | d |
| 111 | " | H | " | OCH₃(2) | Cl(5) | b |
| 112 | 5-Sulfonaphthyl-2 | H | " | OH(4) | H | b |
| 113 | " | H | " | OCH₃(4) | H | b |
| 114 | 1-Sulfonaphthyl-2 | CH₃ | " | " | H | c |

EXAMPLE 115

In analogy with the procedure described in Examples 1 and 2 using appropriate starting materials a dyestuff may be prepared which, in the free acid form, corresponds to the formula

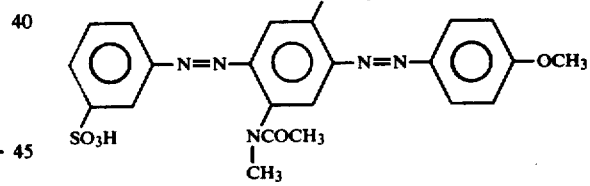

and is obtained in the sodium salt form. The dyestuff gives dyeings on natural or synthetic polyamides of scarletred shades.

The dyestuffs of Example 1 to 115 which are in the sodium salt form may, depending on the reaction/isolation conditions, be obtained in accordance with known methods in free acid form or in other salt forms, for example those salt forms indicated in the descriptionn hereinbefore.

Application Example A

100 Parts of pre-wetted synthetic polyamide, for example nylon 66, are entered at 40° into a dyebath consisting of 4000 parts water, 10 parts of anhydrous sodium sulphate and 2 parts of the dyestuff of Example 2.

The dye liquor is heated over the course of 30 minutes to boiling temperature and kept at this temperature for 1 hour. 4 Parts of glacial acetic acid are then added thereto and dyeing is completed with heating for a further 30 minutes at boiling temperature. During dyeing, the water that evaporates is continuously replaced.

The reddish-yellow dyed nylon cloth is then removed from the liquor, rinsed with water and dried. Wool may also be dyed by the same process.

Similarly, the dyes of Examples 1 and 3 to 115, or mixtures of two or more of the dyestuffs of Examples 1 to 115 may be employed to dye nylon or wool in accordance with the method described above.

Application Example B

Polyamide is printed with a printing paste containing:
30 parts dyestuff of Example 2
50 parts urea
50 parts solubilizing agent (e.g. thiodiethylene glycol)
290 parts water
500 parts suitable thickening agent (e.g. based on carob bean gum)
20 parts acid donating agent (e.g. ammonium tartrate)
60 parts thiourea.

The printed textile goods are steamed for 40 minutes at 102° (saturated steam), rinsed cold, subsequently washed at 60° for 5 minutes with a dilute solution of a conventional detergent and rinsed again with cold water. A reddish-yellow print having notable light- and wet-fastnesses is obtained.

In analogous manner printing pastes may be made employing the dyestuffs of Examples 1 and 3 to 115 or mixtures of two or more of the dyestuffs of Examples 1 to 115. Such pastes may be employed for printing in accordance with the above given procedure.

What is claimed is:

1. A compound of the formula

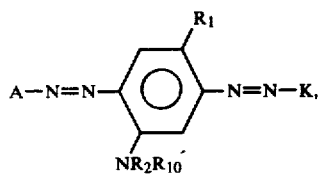

(I)

or a salt thereof the cation of which is non-chromophoric,
wherein
A is a diazo component radical of the aniline or 1- or 2-aminonaphthalene series containing a single sulfo group,
K is a coupling component radical of the phenol series or a coupling component radical of the phenol series the hydroxy group of which is acylated or etherified, with the proviso that K is free of sulfo groups,
$R_1$ is hydrogen, $C_{1-4}$alkoxy, $C_{1-4}$alkyl or $C_{1-4}$haloalkyl,
$R_2$ is $C_{1-4}$alkyl, $C_{1-6}$alkyl—CO—, $C_{1-6}$alkyl—O—CO—, —CONH$_2$, $C_{1-6}$alkyl—N-H—CO—, $(C_{1-6}$alkyl$)_2$N—CO—, 2-, 3-, 4-, 5- or 6-hydroxy($C_{2-6}$alkyl)—NH—CO— or (2-, 3-, 4-, 5- or 6-hydroxy($C_{2-6}$alkyl))$_2$N—CO—, and
$R_{10}$ is hydrogen or $C_{1-4}$alkyl,
wherein each halo is independently fluoro, chloro or bromo, or a mixture thereof.

2. A compound according to claim 1, or a salt thereof the cation of which is non-chromophoric.

3. A compound according to claim 2, or a salt thereof the cation of which is non-chromophoric,
wherein
A is

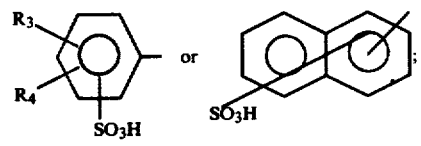

wherein
$R_3$ is hydrogen, halo, $C_{1-4}$alkyl, $C_{1-4}$-haloalkyl, $C_{1-4}$alkoxy, $C_{1-6}$alkylamino, di-($C_{1-6}$alkyl)amino, ($C_{1-6}$alkyl)carbonylamino, ($C_{1-12}$alkoxy)carbonylamino, N-$C_{1-4}$alkyl-N-($C_{1-6}$alkyl)carbonylamino or N-$C_{1-4}$alkyl-N-($C_{1-12}$alkoxy)carbonylamino, and
$R_4$ is hydrogen, halo, $C_{1-4}$alkyl or $C_{1-4}$alkoxy, and
K is

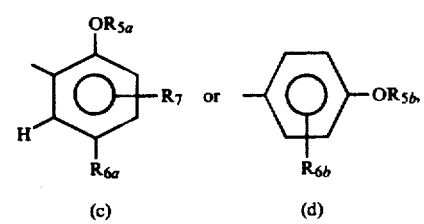

wherein each of
$R_{5a}$ and $R_{5b}$ is hydrogen, $C_{1-4}$alkyl, 2-, 3- or 4-hydroxy($C_{2-4}$alkyl), $R_8$—CO—, $R_8$—O—CO— or

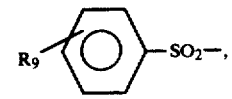

wherein $R_8$ is $C_{1-12}$alkyl or phenyl($C_{1-4}$alkyl), and $R_9$ is hydrogen, halo, $C_{1-4}$alkyl or $C_{1-4}$alkoxy,
$R_{6a}$ is an aliphatic, cycloaliphatic, carbocyclic aryl or araliphatic radical, halo, $C_{1-4}$alkoxy, $C_{1-6}$alkyl—CO—NR$_{11}$— or $C_{1-6}$alkyl—O—CO—NR$_{11}$—, wherein $R_{11}$ is hydrogen or $C_{1-4}$alkyl,
$R_{6b}$ is hydrogen, $C_{1-4}$alkyl, $C_{1-4}$alkoxy, halo, $C_{1-6}$alkyl—CO—NR$_{11}$— or $C_{1-6}$alkyl—O—CO—NR$_{11}$—, wherein $R_{11}$ is hydrogen or $C_{1-4}$alkyl, and
$R_7$ is hydrogen, halo, $C_{1-4}$alkyl, $C_{1-4}$alkoxy or $C_{1-6}$alkyl—CO—NR$_{11}$—,
wherein
$R_{11}$ is hydrogen or $C_{1-4}$alkyl, with the proviso that $R_7$ is hydrogen, halo, $C_{1-4}$alkyl or $C_{1-4}$alkoxy when $R_{6a}$ is $C_{1-6}$alkyl—CO—NR$_{11}$—,
wherein each halo is independently fluoro, chloro or bromo.

4. A compound according to claim 3, or a salt thereof the cation of which is non-chromophoric,
wherein
$R_{6a}$ is $C_{1-10}$alkyl; $C_{5-7}$cycloalkyl; phenyl; phenyl substituted by 1, 2 or 3 substituents each of which is independently halo, $C_{1-4}$alkyl or $C_{1-4}$alkoxy; phenyl($C_{1-4}$alkyl); phenyl($C_{1-4}$alkyl) the phenyl ring of which is substituted by 1, 2 or 3 substituents each of which is independently halo, $C_{1-4}$alkyl or $C_{1-4}$alkoxy; halo; $C_{1-4}$alkoxy; $C_{1-6}$alkyl—CO—NR$_{11}$— or $C_{1-6}$alkyl—O—CO—NR$_{11}$—, wherein $R_{11}$ is hydrogen or $C_{1-4}$alkyl.

5. A compound according to claim 4, or a salt thereof the cation of which is non-chromophoric, wherein $R_{6a}$ is $C_{1-6}$alkyl, cyclohexyl, phenyl, benzyl, chloro, methoxy, ethoxy or acetamido.

6. A compound according to claim 5, or a salt thereof the cation of which is non-chromophoric, wherein $R_{10}$ is hydrogen.

7. A compound according to claim 4, or a salt thereof the cation of which is non-chromophoric, wherein A is 4-, 5-, 6-, 7- or 8-sulfonaphthyl-1, 1-, 5-, 6-, 7- or 8-sulfonaphthyl-2 or

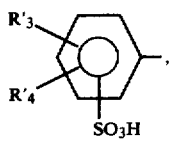     (a₁)

wherein $R_3'$ is hydrogen, halo, $C_{1-4}$alkyl, $C_{1-4}$alkoxy or acetamido, and $R_4'$ is hydrogen, halo, $C_{1-2}$alkyl or $C_{1-2}$alkoxy, $R_1$ is hydrogen, methyl, ethyl, methoxy or ethoxy, $R_2$ is $C_{1-4}$alkyl—CO—, $C_{1-4}$alkyl—O—CO— or —CONH₂, $R_{5a}$ is hydrogen, methyl, ethyl, 2-hydroxyethyl, $R_{8a}'$—CO—, $R_{8b}'$—O—CO, phenylsulfonyl or tosyl, wherein $R_{8a}''$ is methyl, ethyl or benzyl, and $R_{8b}'$ is $C_{1-12}$alkyl or phenyl($C_{1-3}$alkyl), $R_{5b}$ is hydrogen, n-$C_{1-4}$alkyl, 2-hydroxyethyl, 2- or 3-hydroxypropyl, $R_{8a}'$—CO—, $R_{8b}'$—O—CO—, phenylsulfonyl or tosyl, wherein $R_{8a}'$ is $C_{1-4}$alkyl or phenyl($C_{1-3}$alkyl), and $R_{8b}'$ is $C_{1-12}$alkyl or phenyl($C_{1-3}$alkyl), $R_{6a}$ is $C_{1-6}$alkyl, cyclohexyl, phenyl, benzyl, chloro, methoxy, ethoxy or acetamido, $R_7$ is hydrogen, chloro, methyl, ethyl, methoxy, ethoxy or acetamido, with the proviso that $R_7$ is hydrogen, chloro, methyl, ethyl, methoxy or ethoxy when $R_{6a}$ is acetamido, and $R_{10}$ is hydrogen, methyl or ethyl.

8. A compound according to claim 4, or a salt thereof the cation of which is lithium, sodium, potassium, ammonium, methylammonium, dimethylammonium, trimethylammonium, tetramethylammonium, triethylammonium, ethanolammonium, diethanolammonium or triethanolammonium.

9. A compound according to claim 3 having the formula

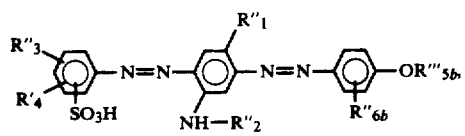

or a salt thereof the cation of which is non-chromophoric, wherein $R_1''$ is hydrogen, methyl or methoxy, $R_2''$ is $C_{1-2}$alkyl—CO—, $C_{1-2}$alkyl—O—CO— or —CONH₂, $R_3''$ is hydrogen, chloro, $C_{1-2}$alkyl, $C_{1-2}$alkoxy or acetamido, $R_4'$ is hydrogen, halo, $C_{1-2}$alkyl or $C_{1-2}$alkoxy, $R_{5b}'''$ is hydrogen or n-$C_{1-4}$alkyl, and $R_{6b}''$ is hydrogen, chloro, methyl, methoxy or acetamido.

10. A compound according to claim 9, or a salt thereof the cation of which is non-chromophoric, wherein $R_3''$ is hydrogen, chloro, methyl, methoxy or acetamido, and $R_4'$ is hydrogen, chloro, methyl or methoxy.

11. A compound according to claim 10, or a salt thereof the cation of which is non-chromophoric, wherein (i) $R_3''$ is hydrogen, $R_4'$ is hydrogen, and the sulfo group is in the 3- or 4-position, (ii) one of $R_3''$ and $R_4'$ is chloro, methyl or methoxy, the other is hydrogen and the sulfo group and the chloro, methyl or methoxy substituent are in the 2,4- or 2,5-positions, (iii) $R_3''$ is 4- or 5-acetamido, $R_4'$ is hydrogen, and the sulfo group is in the 2-position, or (iv) each of $R_3''$ and $R_4'$ is independently chloro, methyl or methoxy and $R_3''$, $R_4'$ and the sulfo group are in the 2,4,5- or 2,4,6-positions.

12. A compound according to claim 9 or 10, or a salt thereof the cation of which is non-chromophoric, wherein $R_{5b}'''$ is methyl or ethyl, and $R_{6b}''$ is hydrogen.

13. A compound according to claim 12, or a salt thereof the cation of which is non-chromophoric, wherein $R_1''$ is hydrogen or methoxy, and $R_2''$ is —CO—CH₃, —CO—O—CH₃ or —CONH₂.

14. A compound according to claim 13, or a salt thereof the cation of which is non-chromophoric, wherein $R_1''$ is hydrogen, and $R_2''$ is —CO—CH₃.

15. A compound according to claim 2, or a salt thereof the cation of which is non-chromophoric, wherein A is

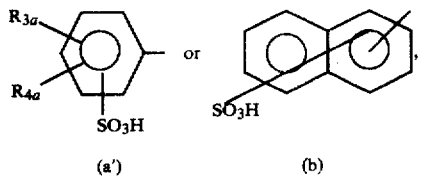

wherein $R_{3a}$ is hydrogen, halo, $C_{1-4}$alkyl, $C_{1-4}$haloalkyl, $C_{1-6}$alkylamino, di-($C_{1-6}$alkyl)amino, ($C_{1-6}$alkyl)carbonylamino, ($C_{1-12}$alkoxy)carbonylamino, N-$C_{1-4}$alkyl-N-($C_{1-6}$alkyl)carbonylamino or N-$C_{1-4}$alkyl-N-($C_{1-12}$alkoxy)carbonylamino, and $R_{4a}$ is hydrogen, halo or $C_{1-4}$alkyl, wherein each halo is independently fluoro, chloro or bromo.

16. A compound according to claim 15, or a salt thereof the cation of which is non-chromophoric, wherein $R_1$ is hydrogen $C_{1-4}$alkyl or $C_{1-4}$haloalkyl.

17. A compound according to claim 16, or a salt thereof the cation of which is non-chromophoric, wherein $R_{10}$ is hydrogen.

18. A compound according to claim 16, or a salt thereof the cation of which is non-chromophoric, wherein $R_2$ is $C_{1-4}alkyl$—CO—, $C_{1-4}alkyl$—O—CO— or —CONH$_2$.

19. A compound according to claim 16, or a salt thereof the cation of which is non-chromophoric, wherein
K is

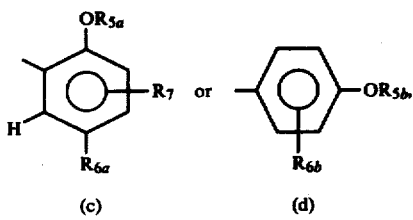

(c)                    (d)

wherein each of
$R_{5a}$ and $R_{5b}$ is hydrogen, $C_{1-4}alkyl$, 2-, 3- or 4-hydroxy($C_{2-4}alkyl$), $R_8$—CO—, $R_8$—O—CO— or

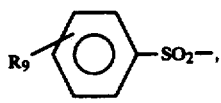

wherein $R_8$ is $C_{1-12}alkyl$ or phenyl($C_{1-4}alkyl$), and $R_9$ is hydrogen, halo, $C_{1-4}alkyl$ or $C_{1-4}alkoxy$,
$R_{6a}$ is $C_{1-6}alkyl$, cyclohexyl, phenyl, benzyl, chloro, methoxy, ethoxy or acetamido,
$R_{6b}$ is hydrogen, $C_{1-4}alkyl$, $C_{1-4}alkoxy$, halo, $C_{1-6}alkyl$—CO—NR$_{11}$— or $C_{1-6}alkyl$—O—CO—NR$_{11}$—, wherein $R_{11}$ is hydrogen or $C_{1-4}alkyl$, and
$R_7$ is hydrogen, halo, $C_{1-4}alkyl$, $C_{1-4}alkoxy$ or $C_{1-6}alkyl$—CO—NR$_{11}$—, wherein $R_{11}$ is hydrogen or $C_{1-4}alkyl$, with the proviso that $R_7$ is hydrogen, halo, $C_{1-4}alkyl$ or $C_{1-4}alkoxy$ when $R_{6a}$ is acetamido,
wherein each halo is independently fluoro, chloro or bromo.

20. A compound according to claim 15, or a salt thereof the cation of which is non-chromophoric, wherein $R_{10}$ is hydrogen.

21. A compound according to claim 15, or a salt thereof the cation of which is non-chromophoric, wherein $R_2$ is $C_{1-4}alkyl$—CO—, $C_{1-4}alkyl$—O—CO— or —CONH$_2$.

22. A compound according to claim 15, or a salt thereof the cation of which is non-chromophoric, wherein
K is

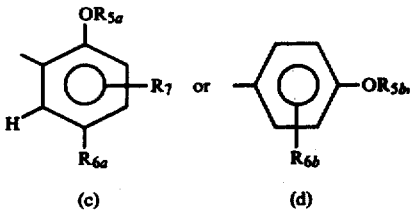

(c)                    (d)

wherein each of
$R_{5a}$ and $R_{5b}$ is hydrogen, $C_{1-4}alkyl$, 2-, 3- or 4-hydroxy($C_{2-4}alkyl$), $R_8$—CO—, $R_8$—O—CO— or

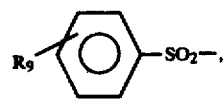

wherein $R_8$ is $C_{1-12}alkyl$ or phenyl($C_{1-4}alkyl$), and $R_9$ is hydrogen, halo, $C_{1-4}alkyl$ or $C_{1-4}alkoxy$,
$R_{6a}$ is $C_{1-6}alkyl$, cyclohexyl, phenyl, benzyl, chloro, methoxy, ethoxy or acetamido,
$R_{6b}$ is hydrogen, $C_{1-4}alkyl$, $C_{1-4}alkoxy$, halo, $C_{1-6}alkyl$—CO—NR$_{11}$— or $C_{1-6}alkyl$—O—CO—NR$_{11}$—, wherein $R_{11}$ is hydrogen or $C_{1-4}alkyl$, and
$R_7$ is hydrogen, halo, $C_{1-4}alkyl$, $C_{1-4}alkoxy$ or $C_{1-6}alkyl$—CO—NR$_{11}$—, wherein $R_{11}$ is hydrogen or $C_{1-4}alkyl$, with the proviso that $R_7$ is hydrogen, halo, $C_{1-4}alkyl$ or $C_{1-4}alkoxy$ when $R_{6a}$ is acetamido,
wherein each halo is independently fluoro, chloro or bromo.

23. A compound according to claim 22, or a salt thereof the cation of which is lithium, sodium, potassium, ammonium, methylammonium, dimethylammonium, trimethylammonium, tetramethylammonium, triethylammonium, ethanolammonium, diethanolammonium or triethanolammonium.

24. A compound according to claim 22, or a salt thereof the cation of which is non-chromophoric, wherein A is 4-, 5-, 6-, 7- or 8-sulfonaphthyl-1, 1-, 5-, 6-, 7- or 8-sulfonaphthyl-2 or

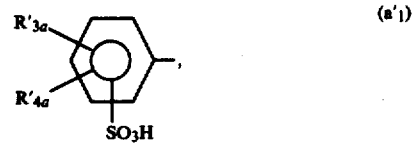

(a'$_1$)

wherein $R_{3a}'$ is hydrogen, halo, $C_{1-4}alkyl$ or acetamido, and $R_{4a}'$ is hydrogen, halo or $C_{1-2}alkyl$,
$R_1$ is hydrogen, methyl, ethyl, methoxy or ethoxy,
$R_2$ is $C_{1-4}alkyl$—CO—, $C_{1-4}alkyl$—O—CO— or —CONH$_2$,
$R_{5a}$ is hydrogen, methyl, ethyl, 2-hydroxyethyl, $R_{8a}'$—CO—, $R_{8b}'$—O—CO—, phenylsulfonyl or tosyl,
wherein $R_{8a}''$ is methyl, ethyl or benzyl, and $R_{8b}'$ is $C_{1-12}alkyl$ or phenyl($C_{1-3}alkyl$),
$R_{5b}$ is hydrogen, n-$C_{1-4}alkyl$, 2-hydroxyethyl, 2- or 3-hydroxypropyl, $R_{8a}'$—CO—, $R_{8b}'$—O—CO—, phenylsulfonyl or tosyl,
wherein $R_{8a}'$ is $C_{1-4}alkyl$ or phenyl($C_{1-3}alkyl$), and $R_{8b}'$ is $C_{1-12}alkyl$ or phenyl($C_{1-3}alkyl$),
$R_{6b}$ is hydrogen, chloro, bromo, methyl, ethyl, methoxy, ethoxy or acetamido,
$R_7$ is hydrogen, chloro, methyl, ethyl, methoxy, ethoxy, or acetamido, with the proviso that $R_7$ is hydrogen, chloro, methyl, ethyl, methoxy or ethoxy when $R_{6a}$ is acetamido, and
$R_{10}$ is hydrogen, methyl or ethyl.

25. A compound according to claim 24, or a salt thereof the cation of which is non-chromophoric, wherein A is 4- or 5-sulfonaphthyl-1, 1-, 5- or 6-sulfonaphthyl-2
or

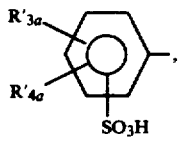

wherein
R$_{3a}'$ is hydrogen, halo, C$_{1-4}$alkyl or acetamido, and
R$_{4a}'$ is hydrogen, halo or C$_{1-2}$alkyl.

26. A compound according to claim 25, or a salt thereof the cation of which is non-chromophoric, wherein
R$_1$ is hydrogen, methyl or methoxy,
R$_2$ is C$_{1-2}$alkyl—CO—, C$_{1-2}$alkyl—O—CO— or —CONH$_2$,
R$_{3a}'$ is hydrogen, chloro, C$_{1-2}$alkyl or acetamido,
R$_{5a}$ is hydrogen, methyl or ethyl,
R$_{5b}$ is hydrogen or n-C$_{1-4}$alkyl,
R$_{6a}$ is C$_{1-4}$alkyl, benzyl, chloro, methoxy or ethoxy,
R$_7$ is hydrogen, chloro, methyl, methoxy or acetamido and
R$_{10}$ is hydrogen or methyl.

27. A compound according to claim 26 having the formula

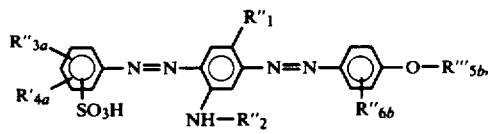

or a salt thereof the cation of which is non-chromophoric,
wherein
R$_1''$ is hydrogen, methyl or methoxy,
R$_2''$ is C$_{1-2}$alkyl—CO—, C$_{1-2}$alkyl—O—CO— or —CONH$_2$,
R$_{3a}''$ is hydrogen, chloro, C$_{1-2}$alkyl or acetamido,
R$_{4a}'$ is hydrogen, halo or C$_{1-2}$alkyl,
R$_{5b}'''$ is hydrogen or n-C$_{1-4}$alkyl, and
R$_{6b}''$ is hydrogen, chloro, methyl, methoxy or acetamido.

28. A compound according to claim 27, or a salt thereof the cation of which is non-chromophoric, wherein
R$_{3a}''$ is hydrogen, and
R$_{4a}'$ is hydrogen.

29. A compound according to claim 28, or a salt thereof the cation of which is non-chromophoric, wherein the sulfo group is in the 3- or 4-position.

30. The compound according to claim 29 having the formula

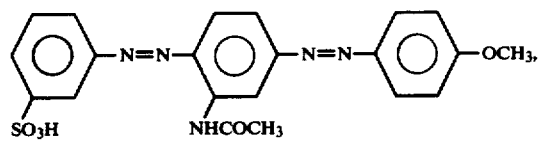

or a salt thereof the cation of which is non-chromophoric.

31. The sodium salt of the compound according to claim 30.

32. The compound according to claim 29 having the formula

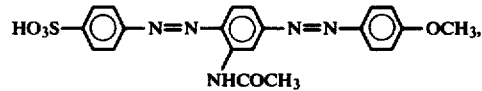

or a salt thereof the cation of which is non-chromophoric.

33. The sodium salt of the compound according to claim 32.

34. The compound according to claim 29 having the formula

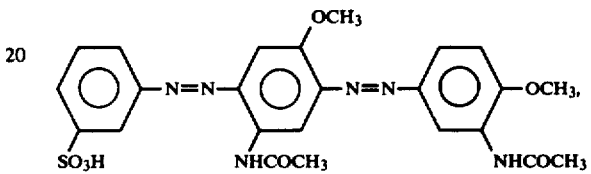

or a salt thereof the cation of which is non-chromophoric.

35. The sodium salt of the compound according to claim 34.

36. The compound according to claim 29 having the formula

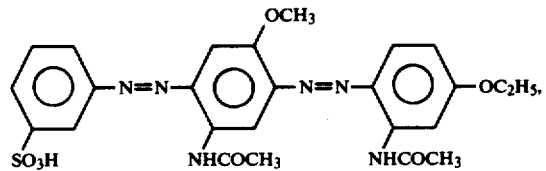

or a salt thereof the cation of which is non-chromophoric.

37. The sodium salt of the compound according to claim 36.

38. The compound according to claim 29 having the formula

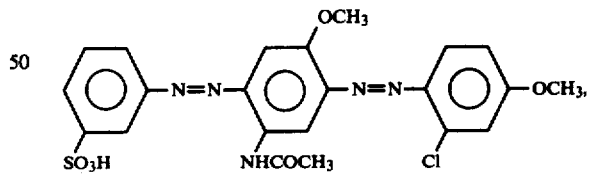

or a salt thereof the cation of which is non-chromophoric.

39. The sodium salt of the compound according to claim 38.

40. A process for dyeing or printing an anionic dyeable substrate comprising applying to an anionic dyeable substrate a compound according to claim 1 or 15, or a salt thereof the cation of which is non-chromophoric, or a mixture thereof, as dyeing or printing agent.

* * * * *